US006346573B1

(12) United States Patent
White

(10) Patent No.: US 6,346,573 B1
(45) Date of Patent: *Feb. 12, 2002

(54) AMINE-MODIFIED EPOXY RESIN REACTED IN PRESENCE OF LATENT HARDENER

(75) Inventor: Peter Drummond Boys White, Ross-On-Wye (GB)

(73) Assignee: Vantico Inc., Brewster, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,049

(22) PCT Filed: Nov. 18, 1996

(86) PCT No.: PCT/GB96/02822

§ 371 Date: May 18, 1998

§ 102(e) Date: May 18, 1998

(87) PCT Pub. No.: WO97/19125

PCT Pub. Date: May 29, 1997

(30) Foreign Application Priority Data

Nov. 18, 1995 (GB) ............................................. 9523649

(51) Int. Cl.$^7$ .......................... C08G 59/50; C08K 5/06; C08K 5/17; C08K 5/25; C08L 63/02
(52) U.S. Cl. ....................... 525/121; 523/453; 523/456; 523/457; 523/461; 523/466; 525/113; 525/114; 525/115; 525/523; 525/533; 528/121; 528/122; 528/124
(58) Field of Search ................................. 525/523, 113, 525/114, 115, 121, 533; 523/453, 456, 461, 457, 466; 528/121, 122, 124

(56) References Cited

U.S. PATENT DOCUMENTS

| 3,454,421 A | * | 7/1969 | Westbrook .................... 528/94 |
| 4,031,043 A | * | 6/1977 | Schmitter et al. | |
| 4,767,805 A | * | 8/1988 | Tada et al. ................... 523/468 |
| 5,274,006 A | * | 12/1993 | Kagoshima et al. .......... 521/85 |
| 5,470,886 A | * | 11/1995 | Makhlouf et al. ........... 523/206 |

FOREIGN PATENT DOCUMENTS

| CS | 244057 | * | 7/1986 |
| DE | 2131929 | * | 1/1973 |
| EP | 488949 | * | 6/1992 |
| EP | 514335 | * | 11/1992 |
| FR | 2164887 | | 8/1973 |
| GB | 2007233 | * | 5/1979 |
| JP | 57-12082 | * | 1/1982 |
| JP | 57-23423 | * | 2/1982 |
| JP | 2-125731 | * | 5/1990 |
| JP | 4-266939 | * | 9/1992 |
| JP | 4-266940 | * | 9/1992 |
| JP | 7-149928 | * | 6/1995 |
| WO | 86/00627 | | 1/1986 |
| WO | 93/14136 | | 7/1993 |
| WO | 95/21738 | | 8/1995 |

OTHER PUBLICATIONS

Derwent Abstract No. 90–309077 for Japanese Patent No. 2–218,715, 8/90.
Derwent Abstract No. 79–26941B for Japanese Patent No. 54–26856, 2/79.

* cited by examiner

Primary Examiner—Robert E. L. Sellers
(74) Attorney, Agent, or Firm—Lyon & Lyon LLP

(57) ABSTRACT

A method for the manufacture of a one-component epoxy resin system comprises mixing at 15–30° C. and reacting at room temperature over 2–14 days (A) an epoxy resin and (B) an amine solidifying system present in insufficient quantities to cause gelation to yield a product with a Kofler Heat Bank melting point of less than 55° C. and a melting point stability of at least six months at normal workshop temperatures in the presence of (C) a hardener for (A) and the reaction product of (A) and (B) which is different from (B) and remains unreacted with (A) and (B) during the their reaction, (E) an expanding agent and (D) additives other than the expanding agent, provided that the reaction between (A) and (B) does not generate enough heat to activate a reaction between the remaining epoxy groups and hardener (C) or expanding agent (E).

14 Claims, No Drawings

AMINE-MODIFIED EPOXY RESIN REACTED IN PRESENCE OF LATENT HARDENER

Hot melt one component thremosettable epoxy resin compositions are difficult and hazardous to manufacture and pack. These difficulties often give rise to variability in the product both from batch to batch, container to container and even within containers.

These problems arise because the compositions contain viscous or solid resins as well as hardeners and are mixed in the hot viscous molten state. This can result in the reaction fully or partially occurring during mixing, discharging, or even in the end container.

This invention relates to methods utilizing a specific type of composition for the safe and consistent manufacture and where required the simple filling of end use containers of one component heat curable, solvent free, hot melt epoxy resin compositions which have a melting point less than 55° C.

Because of safety, cost and possible environmental pollution it is becoming increasingly important to avoid the use of volatile solvents in industrial processes. Because of the need to maintain a safe, clean and healthy workplace, as well as manufacturing convenience, contact with all liquid chemicals should be avoided wherever possible.

These needs favour the use of epoxy resin formulations in solvent free, flexible or solid form and account in part for the increasing popularity of preimpregnated fibres, or prepregs, for the manufacture of reinforced composites, adhesives in hot melt and flexible tape form for bonding and the use of powders for coatings.

It is very important that the physical nature of these epoxy formulations is very consistent during storage because this affects the ability to apply them reliably and produce consistent quality items with them.

Mixing of the epoxy formulation does not present manufacturing problems is made in solution, as the ingredients can be mixed at low temperatures to avoid dangerous reaction between the resins and hardeners present, due to the low mix viscosities achieved by the use of solvents, but the manufacture and packaging of solvent free individual batches of reactive hot melt epoxy resin and hardener is much more difficult and dangerous, especially when the final composition is required to cure at temperatures say up to 180° C., due to the risk of the curing reaction being initiated prematurely.

Alternatively, mixing of the ingredients can be carried out continuously, which usually avoids the danger of major heat or reaction being given out in the blending equipment, even if carried out at elevated temperatures because only small quantities are present in the mixer at any one time. But the danger remains of reaction in the containers the mixture is poured into.

The result of reaction may be very serious where it proceeds out of control, leading to large quantities of decomposition gases, burnt products, damaged equipment and harzards to personnel, the workplace and the environment in general. Where the reaction only partly proceeds it leads to an increase of average molecular weight, either in the whole batch, or variably within a batch, or a container, for example as the result of different heating times coming from the variation in run-out times from the mixing vessel or cooling within a container. Any such partial reaction is very bad as it results in changed application and uncured physical properties either of the whole batch or container or, more likely, variability within it.

Because of these difficulties the volumes of many hot melt epoxy compositions that can safely be mixed at one time or be put hot into a compact bulk in a container rarely exceed 100 liters. Where the final composition is required to cure at 130° C. or below even 25 liter mixes are potentially dangerous.

Whether mixed continuously or batchwise the filling of small containers with hot viscous reactive liquids present major problems, particularly so when the viscosities at the permitted filling temperatures are high.

So a new method was needed to manufacture these difficult and hazardous materials both safely and in reproducible quality, including their presentation in practical end use containers.

We have now discovered a surprisingly simple way to make these one component epoxy hot melts consistently and safely and supply them in a wide variety of containers and shapes suitable for later hot melt or other processing applications. This process uses very mild conditions and consists of making an epoxy formulation which is liquid at 80° C. or below, more usually at normal shop floor temperatures (15° C.–30° C.) and adding to it a chemical solidifying system which reacts very slowly at these temperatures with the epoxy materials present.

The solidifying system must be picked to give very little reaction during the time it is being mixed with the epoxy resin and hardeners, by whatever method this is done, so that there is very little viscosity rise or temperature rise during the blending operation and hence making the filling of large or small, simple or complicated containers a relatively easy task. Alternatively mixing may take place in the final container if required.

The solidifying reaction must be a simple amine addition reaction with the epoxy groups and must stop when the addition reaction stops. No tertiary amines may be present in the initial mixture or generated during the reaction which could significantly react under the conditions chosen for the solidification reaction. Such reactions severely compromise, safety during bulk mixing, the state of solidification once mixed and the melting point stability and shelf life of the resultant product. The solidifying system must be picked to satisfy these criteria.

The levels of solidifying system used have a major effect on the physical nature of the fully reacted, uncured product. With a liquid resin increasing amounts of solidifying systems take the product through the stages of high viscosity, high tack, low tack, zero tack, flexibility and brittleness respectively.

For convenience, most of the solidification reaction should take place in the final containers used to receive the mixture and this should take place slowly enough to ensure that, in the selected size and shape of the container, there is no temperature rise high enough to cause any significant reaction between the epoxy resins and their main curing systems, but fast enough to ensure useability in a sensible time.

The solidifying agent may be introduced into the mixture at any stage in the process provided the reaction basically proceeds as above.

As the necessary quantity of the solidification system reacts the viscosity and melting point of the formulation increases until the reaction approaches completion when the physical nature of the final formulation is close to the desired end use requirements.

The present invention provides for the manufacture of one component hot meltable thermosettable epoxy resin formulations in bulk form in batch or continuous mixes and their presentation in containers intended for further processing by melt, or other, application methods and includes their composition in hot meltable, molten, powdered, solid, semi solid, tacky, bulk and final cured forms. For example the method of this invention could be performed using the following classes of ingredients:

(A) epoxy resins or compound containing more than one epoxy group compounds (B) a solidifying amine system which will react with (A) to give a product with a Kofler Heat Bank melting point of less than 55° C., but which is not present in sufficient quantities to allow or cause chemical gelation under the reaction conditions chosen for (A) and (B) and which essentially stops solidifying once its active epoxy additive hydrogen groups are consumed by the epoxy groups, optionally (C) a hardener system for (A) and the reaction product of (A) and (B) which is different from (B) and which remains substantially unreacted under the conditions of reaction chosen for (A) and (B), optionally (D) other additives that may be required to modify the physical properties of the cured or uncured composition, and optionally (E) an expanding agent.

The method is carried out by blending (A), (B), and optionally (C), (D) and (E) together by any convenient batch or continuous operation but in such a way that at least (A) and (B) become homogeneous. The reaction between (A) and (B) may be carried out at any suitable temperature and condition provided that neither it, nor the exothermic heat generated from it causes (C) or (E) to substantially react whilst it is taking place.

The epoxy resins or compound containing more than one epoxy group compounds, (A) employed in this invention may be glycidyl ethers, glycidyl amines, glycidyl esters or cycloaliphatic glycidyl compounds, or combinations of these including halogenated versions where required. Preferred epoxy resins and blends are those which are suitable liquids for ready mixing with the other ingredients at suitable temperatures which will usually be below 100° C. Epoxy resins or compound containing more than one epoxy group compounds or blends of them which are liquid at room temperatures are the most convenient.

The preferred solidifying systems (B) used to convert the liquid resins are principally compounds or mixtures of compounds whose most reactive groups relative to the epoxy materials employed are primary or secondary amines. Epoxy reactive tertiary amines under the conditions of reaction chosen for (A) and (B) are not acceptable for this invention.

Of particular usefulness in this process are aromatic and cycloaliphatic primary and secondary amines and blends of these. The major advantage of these amines, particularly the aromatic amines, is the low rate of reactivity coupled with the extremely long life at normal ambient temperatures of their reaction products with the resins. With the majority of compounds from these classes of amines the life of the reaction product with the resins greatly exceeds that of the life of the resins with their primary hardeners (C). Some alicyclic, heterocyclic and aliphatic amines are also effective as advancing agents and those which comply with virtual cessation of reaction once their amino hydrogen atoms have been consumed by the epoxy resins are considered as part of this invention. In all cases it is essential that the tertiary amines generated during the solidification reaction have very low reactivity with epoxy groups under the conditions of reaction chosen for (A) and (B) and afterwards during storage. The solidifying amines are usually and mostly difunctional and/or polyfunctional with respect to the epoxy compounds, (A), although monofunctional amines can be used to some extent if of value to a particular composition.

Difunctional amines may be used at any desired ratio with difunctional epoxy resins but greater than difunctional amines only to levels where gelation does not occur. The solidifying systems may contain a variety of other groups but these should only be of very low or no reactivity towards the epoxy groups involved under the reaction of (A) with (B).

The hardener systems (C) for component (A) and the reaction products between (A) and (B) can be selected from the wide variety of those well known in the field of epoxy chemistry other than acid anhydrides which react preferentially with the advancing agents (B). Typical but not exclusive examples of useful hardeners are aromatic amines such as diaminodiphenyl sulphones, boron trifluoride amine complexes, latent imidazoles, polycarboxylic acids, polyhydrazides, dicyandiamide, latent epoxy amine adducts and substituted ureas. As explained a main requirement of the hardener is that it should not substantially react whilst (A) and (B) are being reacted to form the epoxy composition which has a melting point less than 1 20° C. There may be one or several hardeners used together, some of which may accelerate the curing rates of the others provided they comply with the requirement immediately above.

Other additives (D) which can be used to modify the physical properties of the cured or uncured compositions include but are not limited to thixotropes, toughening agents, wetting agents, surfactants, fibrous materials, dyes, pigments, fillers, flame retardants, smoke suppressants, coupling agents, hollow microspheres, flow assisting materials, fusible glasses, expanding agents and stabilisers.

Suitable expanding agents are those which generate gases by chemical decomposition or by boiling of liquids or expansion of gases contained within exandable shells.

Examples of suitable expanding agents include Azodicarbonamide, Azodiisobutyronitrile, Benzene sulphonhydrazide, Dinitroso pentamethylene tetramine, Oxybis benzene sulphonhydrazide, p toluene sulphonyl hydrazide and Expandable plastic such as those sold under the Trade Name Expancel. These are largely spherical shells of varying composition such as polyvinylidene chloride and or polyacrylonitrile plus other copolymerised additives, and the inside contains isopentane ±air.

It will be clear to those familiar with epoxy resins that the actual mixing and storage temperatures, the geometry and volume of the mixing vessel and the containers the mixing and filling times required as well as the actual resins and the quantity of them used will all influence the selection of the solidifying agents. It would not be good for instance to choose a solidifying agent which reacts to generate substantial heat during the mixing operation or in the selected container shape and size. Thus the less reactive amines are the most suitable solidifying agents for practical batches and containers whereas most aliphatic amines are unsuitable alone, because they are highly reactive.

Most useful are those solidifying systems which react gradually to substantial completion at room temperatures over a period of around 2–14 days. These permit the safe manufacture of batches in excess of 100 liters in a realistic mixing time with little temperature rise in the mixing vessel or during discharge and smooth reaction to the required physical state in most practical containers, however mixed, over a practical timescale. Under these conditions the heat of reaction generated by the soldification process is evenly dissipated by conduction and radiation and results in no more than acceptable temperature rises at any stage in the process.

The primary controlling factor being that the mixture reaction temperature rise whether in the mixing vessel or the containers shall be below that required to cause significant reaction between (A) and (C).

Should it be desirable to speed the solidification in the final container this can be achieved by heating, provided the temperature used does not cause significant reaction of (C) with (A) or the reaction product of (A) with (B) either by direct heat or that evolved by completing the reaction between (A) and (B), or by the addition of accelerators such as carboxylic acids, which do not adversely affect the softening point stability.

The solidifying systems must be present in such quantities that when their amino hydrogen atoms are all substantially reacted with the epoxy materials (A) under the conditions set for reacting (A) and (B) the product is not chemically gelled and has a melting point which is essentially stable for greater than 6 months at 22° C.

The selection and quantity of the solidifying agent will also influence a variety of properties such as melt viscosity, stength, toughness and heat resistance and by careful choice advantages may be designed into the uncured or cured products resulting from the use of this process.

Examples of this invention are as follows and particularly illustrate the effects of solidifying systems. Where no hardener (C) is quoted it is clear that such a material can be added in a practical product if required. Such examples shows that the process of advancing the epoxy resins use is in full accordance with this invention and do give the shelf life stability of at least six months which is an integral advantage of this invention.

EXAMPLE 1

The following mixture was made in a blade mixer:

| | |
|---|---|
| Liquid Bisphenol A epoxy resin (EPIKOTE 828 - SHELL CHEMICAL CO) (epoxy value 5.3 equivalents per kilogram) | 100 kilograms |
| Solidifying agent Hardener 932 (ex CIBA-GEIGY) - a blend of aromatic amines | 6 kilograms |

The initial temperature of the ingredients was 26° C.

After mixing for 30 minutes it was discharged into drums—at that time the mix temperature was 26.5° C.

A standard 25 kg drum of this mixture was monitored for temperature rise in a room temperature of 220° C.

The maximum temperature recorded of the reacting mixture was 27.6° C. which was reached 5 hours 30 minutes after the start of mixing.

After seven days at 220° C. the resulting solidified resin was a tacky solid which when hot melted onto a polythene sheet gave a tacky flexible film suitable in nature for making prepregs or adhesive tapes.

After 14 days at 22° C. the mixture was still tacky and flexible but slightly harder than after 7 days.

1 kilogram of this 14 day old blend was then heated to 80° C. for 2 hours. On cooling it differed little from the unheated material showing that the solidifying reaction was almost complete at 22° C. and heating at 80° C. for 2 hours had no adverse physical effect. Samples of the post heated and unheated solidified products were stored at room temperature for occasional physical assessment. No noticeable change in tack or flexibility occurred for at least 9 years.

EXAMPLE 2

A similar experiment was carried out to EXAMPLE 1 in which the solidifying agent was increased in quantity to 8 kilograms.

The maximum temperature rise recorded in a 25 kg full drum was 2.2° C. that is from 260° C. to 28.2° C.

The product after 14 days storage at 22° C. was a soft solid with a low level of tack and could be ideal for tape adhesive manufacture. Storage of unheated samples and others post heated for 2 hours at 80° C. showed no obvious change in flexibility after 8 years.

EXAMPLE 3

A similar experiment was carried out to EXAMPLE 1 in which the solidifying agent was made up as follows:

| | |
|---|---|
| Hardener 932 | 10.0 kilograms |
| Aminobenzene | 1.9 kilograms |

This mixture was added to 100 kilograms of the Bisphenol A resin and rapidly stirred in a planetary mixer for 30 minutes.

The temperature of the starting materials was 23° C.

After mixing for 30 minutes the temperature was 26° C.

The maximum temperature reached in a 25 kg full drum was 31° C.

After 14 days this mixture was a hard, brittle solid at 22° C. which on heating to 55° C. became a flexible solid.

The mixture was cast onto release paper at 120° C. and after cooling could easily be broken into flakes at 22° C. which only slowly stuck together at this temperature.

When applied to heated clean metal surfaces at 120° C. and these being held together until cool then even without a hardener for the resins the solidified product acted as a hot melt adhesive.

EXAMPLE 4

The following mixture was made in a Z blade mixer:

| | |
|---|---|
| Liquid Bisphenol A epoxy resin (I.Y556 - CIBA-GEIGY) | 100 kilograms |
| Hardener 932 (ex CIBA-GEIGY) | 7 kilograms |
| Micronised dicyandiamide | 5 kilograms |
| 1 phenyl 33 dimethyl urea | 4 kilograms |
| Finely divided silica thixotrope | 4 kilograms |

All the ingredients were blended together until homogeneous and free from lumps. This took around 40 minutes during which the temperature of the mixture increased from 22° C. to 24° C. The contents, which were a soft runny paste, were poured into drums containing 25 kgs of mixture and the temperature of these drums measured regularly. The maximum temperature reached was 29° C. After 14 days the contents were heated to 50° C. and poured into a heated bath and then cast into a thin film on release foil. The films produced had good flexibility and tack and were easily impregnated into unidirectional carbon tape and carbon fabrics. The prepregs also had excellent tack and drape as required by the composites industry. On heating the formulation for 1 hour at 120° C. or 4 hours at 92° C. excellent thermoset cured products were obtained with Tgs of 130° C. and 125° C. respectively. Prepregs were stored at room temperature and −16° C. to test their shelf life by loss of lack and flow on heating.

| | Storage at R. Temp. | Storage at −16° C. |
|---|---|---|
| Tack life | greater than 6 months | greater than 1 year |
| Gel time | 10–12 months | greater than 3 years |

By deduction from EXAMPLE 2 the limit on the storage life is set by the hardener system rather than the solidifying system.

EXAMPLE 5

A similar experiment was carried out to EXAMPLE 4 but 1 kilogram of accelerator DY219 (believed to be a liquid carboxylic acid ex CIBA-GEIGY) was included in the mixture. During 20 minutes mixing the temperature increased from 22° C. to 260° C. The contents were poured into drums containing 25 kgs and the maximum temperature recorded was 34° C. After 2 days storage at 22° C. the product was a lightly tacky flexible solid suitable for the manufacture of prepregs without the need for preheating to 50° C. as in EXAMPLE 4.

EXAMPLE 6

A mixture was made in a high speed stirrer as follows:

| | |
|---|---|
| Liquid Bisphenol A resin | 100.0 kilograms |
| 3,3' dimethyl 4,4' diamino dicyclohexyl methane | 6.5 kilograms |

The starting temperature of the materials was 22° C.

After 10 minutes mixing the temperature had increased to 28° C. and the mixture was poured into metal trays containing 25 kg. The temperature of the mixture in the trays rose steadily to reach 44° C. in 90 minutes. It then gradually cooled to a room temperature of 22° C.

The resultant solidified resin had good tack and flexibility and should be excellent for the manufacture of prepregs.

1 kilogram of this blend was heated for 2 hours at 80° C. and showed no obvious change in tack or flexibility when cooled to room temperature.

On storage at room temperature the solidified resin showed some decrease in tack but was still flexible after 18 months.

EXAMPLE 7

The following mixture was made in a planetary mixer:

| | |
|---|---|
| Liquid Bisphenol A resin | 100 kilograms |
| 3,3' dimethyl 4,4' diamino dicyclohexyl methane | 6 kilograms |
| Aluminium powder | 150 kilograms |
| Micronised Dicyandiamide | 6 kilograms |
| Finely divided silica thixotrope | 2 kilograms |

All the ingredients were blended together for 20 minutes, during the temperature of the mix increased from 20° C. to 26° C. The contents were poured in 25 kg lots into lined metal trays. After 2 hours a maximum temperature of 48° C. was reached by the resin mixes. After 14 days each separat lot of 25 kilograms of the solidified resin was a tacky flexible solid. Each was heated to 60° C. and cast into a tape on release foil. These tapes were used to bond 16 s.w.g. aluminium alloy sheets together in lap shear joints. A one half inch overlap bond was made. The assemblies were cured under light pressure for 1 hour at 1 80° C. When tested in lap shear the following breaking loads were recorded:

| | |
|---|---|
| Lot 1 | 1,730 lbs |
| Lot 2 | 1,840 lbs |
| Lot 3 | 1,900 lbs |
| Lot 4 | 1,800 lbs |
| Lot 5 | 1,780 lbs | and these demonstrated the excellent reproducibility of the process.

The tape was stored at room temperature and −16° C. to assess tack and flexibility life. The film remained tacky at room temperature for at least 6 months and did not lose flexibility in 12 months. At −16° C. tack life has been preserved for at least 3 years.

EXAMPLE 8

The following mixture was prepared:

| | |
|---|---|
| Liquid Bisphenol A epoxy resin (EPIKOTE 828) | 10 kilograms |
| 4,4' diamino diphenyl methane | 1 kilogram |

The amine and two kilograms of resin were quickly warmed to melt the solid flakes and obtain a uniformly stirred mixture. This was immediately added to the remaining 8 kilograms or cold resin in a Z blade mixer.

When thoroughly mixed it was poured into a drum at 24° C., the mixture being at 28° C. After 14 days the mixture had become a hard brittle solid at 23° C. This solid was easily broken into lumps on impact and these were quickly ground into a powder. This powder easily melted on warming and had a softening point of less than 50° C. The powder quickly sintered together on standing at 23° C. The material is an interesting one in its own right but is unsuitable for use in powder form if used or stored at normal shop floor temperatures.

EXAMPLE 9

The following mixture was made in a Z blade mixer:

| | |
|---|---|
| Liquid Bisphenol A epoxy resin (EPIKOTE 828) | 10.0 kilograms |
| 3,3' dimethyl 4,4' diamino dicyclohexyl methane | 0.7 kilograms |

When properly mixed the liquid was poured into a mould and the maximum temperature reached was 40° C.

The product when cooled to 22° C. was a lightly tacky, soft flexible solid. After 14 days at 22° C. it was a little less tacky but still a soft flexible solid. It stayed in this condition basically unchanged for 2 years at 22° C.

A portion of this product was heated to 60° C. for 7 days. During this period it stayed at liquid at 60° C. and on cooling to 22° C. was still a soft solid but rather less tacky. This EXAMPLE shows the excellent stability of the basic liquid epoxy resin and its solidified product to the tertiary amine created by reacting the epoxy resin groups with this amine.

EXAMPLE 10

The following mix was made:

| | |
|---|---|
| GY 260 (~5.3 epoxy/kg) | 100.00 |
| 1,1,3,3-tetramethyl butylamine | 17.3 |

The mixture reacted slowly at 22° C. After 18 days it was a semi solid with a melting point of approximately 30° C. After 121 days at 22° C. the composition appeared unchanged and possessed a similar melting point.

A further sample of this composition, freshly prepared, produced a material of the same texture at 22° C. after heating for 23 days at 60° C.

This is an example of a hindered aliphatic amine (B) which would be suitable for the present invention when a latent hardener (C) was incorporated into the composition.

EXAMPLE 11 to 13

The following mixtures were made in a planetary mixer:

|  | EXAMPLE | | |
| --- | --- | --- | --- |
|  | 11 | 12 | 13 |
| Liquid Bisphenol A epoxy resin-kilograms (EPIKOTE 828 - SHELL CHEMICAL CO) (epoxy value 5.3 equivalents per kilogram) | 100 | 100 | 100 |
| amino benzene-kilograms | 5 | 8 | 12 |
| They were poured into 25 kilogram drums. The initial temperature of all five mixtures was 21° C. | | | |
| Maximum temperature rise | 2° C. | 2.2° C. | 3.4° C. |
| Texture after 14 days at 22° C. | soft.tacky | flexible slight tack | hard brittle |
| After 5 hours at 60° C. examined at 23° C. | soft. tacky | flexible slight tack | hard brittle |
| Kofler Heat Bank Melting point ° C. | below 22* | below 22* | approx. 55 |
| Kofler Heat Bank Melting point ° C. after 4 years storage at shop floor temperature | below 22* | below 22* | approx. 57 |

*too low to record on Kofler Heat Bank.

These examples show the wide range of texture that can be achieved in hot meltable products made using this invention.

They also show the very low exotherms that can be achieved during mixing and solidifying which clearly show that very heat sensitive hardeners (C) can safely be added.

They also show the excellent stability achievable on shopfloor storage which is a great advantage of this invention.

EXAMPLE 14 to 16

The following mixtures were made in a planetary mixer:

|  | EXAMPLE | | |
| --- | --- | --- | --- |
|  | 14 | 15 | 16 |
| EPIKOTE 828 kilograms | 10.0 | 10.0 | 10.0 |
| amino benzene kilograms | 0.5 | 0.8 | 1.2 |
| dicyandiamide fine powder kilograms | 0.8 | 0.7 | 0.5 |
| They were poured into 25 kilogram durms. The initial temperature was 22° C. | | | |
| Maximum temperature rise ° C. | 2 | 2 | 3 |
| Texture after 14 days at 22° C. | soft tacky | flexible slight tack | hard brittle |
| Texture after 5 hours at 60° C. examined at 22° C. | soft tacky | flexible slight tack | hard brittle |
| Kofler Heat Bank Melting point after 14 days at 22° C. in ° C. | below 22* | below 22* | approx. 55 |
| Texture after 6 months at shop floor temperature examined at 22° C. | soft tacky | flexible slight tack | hard brittle |
| Kofler Heat Bank Melting point after 6 months storage at shop floor temperature in ° C. | below 22* | below 22* | approx. 55 |
| Texture after 1 year at shop floor temperature examined at 22° C. | flexible low tack | flexible no tack | hard brittle |
| Kofler Heat Bank Melting point after 1 year at shop floor temperatures in ° C. | below 30* | below 35* | approx. 55 |
| Texture after 4 years at shop floor temperatures examined at 22° C. | hard brittle | hard brittle | hard brittle |

|  | EXAMPLE | | |
| --- | --- | --- | --- |
|  | 14 | 15 | 16 |
| Kofler Heat Bank Melting point after 4 years storage at shop floor temperatures in ° C. | approx. 45 | approx. 47 | approx. 58 |

*too low to record on Kofler Heat Bank.

After 14 days at 22° C. portions of EXAMPLES 14 to 16 were coated onto 16 s.w.g. aluminium alloy sheets which had been preheated to 120° C. Lap shear joints were produced using a width of one inch with a one-half inch overlap. The assemblies were cured under light pressure for 1 hour at 180° C. When tested in lap shear the following average breaking loads were recorded:

| EXAMPLE 14 | 1,620 lbs |
| --- | --- |
| EXAMPLE 15 | 1,920 lbs |
| EXAMPLE 16 | 2,430 lbs |

These examples show the excellent workshop stability of this invention.

They also show by comparison with EXAMPLES 11 to 13 that with lower melting point curable hot melt formulations the storage stability is controlled by the primary hardener (C) rather than the solidifying system (B).

They also demonstrate the excellent shear strength properties achievable using materials according to the invention.

EXAMPLE 17

The following mixture was made in a planetary mixer:

| | 17 |
|---|---|
| EPIKOTE 828 | 100 |
| 3,3' dimethyl 4,4' diamino dicyclohexylamethane | 7 |
| dicyandiamide fine powder | 5 |
| silica thixotrope fine powder | 4 |
| 1 phenyl 33 dimethyl urea | 4 |
| Texture after 24 hours at 22° C. | soft sticky |
| Texture after 120 hours at 22° C. | soft tacky |
| Texture after 14 days at 22° C. | soft tacky |
| Texture after 6 months at 22° C. | soft flexible |
| Texture after 1 year at 22° C. | brittle |
| Texture after 2 years at 22° C. | gelled |

EXAMPLE 18

Lap shear joints were prepared according to EXAMPLE 14 with the composition of EXAMPLE 17. After curing for 4 hours at 92° C. an average breaking load of 1.426 lbs was recorded. This demonstrates the ability of using a composition of this invention to achieve at least six months flexible life at shop floor temperature together with the ability to cure at very low temperatures and achieve high shear strengths.

The products resulting from EXAMPLES 11, 12, 13, 14, 15 and 17 possess tack and or flexibility at normal workshop temperatures and are good for uses where lower temperature application is important and where resistance to damage where applied and before curing is highest. The products resulting from EXAMPLES 13 and 16 are completely dry and can be used for adherring materials together before final curing and for storage of parts without readily tacking together before final assembly and cure. These EXAMPLES show that it is easily possible to design in the physical uncured characteristics of the products as well as the final cured properties by the use of this invention.

As may be seen from the foregoing examples, this chemical approach to the production of curable epoxy hot melt compositions employs conditions much less rigorous than current standard techniques which require mix temperatures of around 60°–100° C. or even above.

EXAMPLE 19

A mixture was made of:

| | |
|---|---|
| GY 260 (~5.3) | 100.0 parts by weight |
| 4,4' diamino 3,3' dimethyl dicyclohexyl methane | 7.0 parts by weight |
| 3 chloro 4 methyl phenyl 1,1 dimethylurea | 3.5 parts by weight |
| dicyandiamide | 7.0 parts by weight |
| hydrophobic fumed silica | 7.5 parts by weight |
| Expancel DU551 | 3.0 parts by weight |

This non flowing paste was easily extruded (or placed) into a plastic (polypropylene) cartridge and allowed to react at 22° C.

After 24 hours it was a lightly tacky putty. The loaded cartridge then placed in an oven for 2 hours at 50° C. On cooling it was a flexible non tacky putty.

On warming the cartridge to 60° C. the mixture became soft and could be extruded easily through the integral nozle.

The composition was extruded onto a flat clean metalic plate in a preset pattern. On cooling the warmed material regained its putty like consistency and maintained its shape and adhered to the plate.

The plate was then placed in an oven at 120° C. for 60 minutes. After this time the composition had foamed and hardened and basically retained the initial laid down extruded pattern. The cured framed mixture showed strong adhesion to the metal plate.

It will be clear from these examples that this invention provides for the safe and reproducible quality manufacture and isolation of solvent free, one component, thermosettable epoxy formulations in suitable shape and form for further hot melt or other processing applications. These may well then be used in the casting of tapes as adhesives or for impregnation into fibres to make prepregs or general use as adhesives, encapsulants, electrically insulating materials and mouldings amongst others as well. They may be used in other shapes such as rods, pellets, powders and sheets or applied as coatings or discreet spots or any other pattern for a variety of purposes as requirements for solvent free one part epoxy resin systems grow.

With the current invention, in many cases, the epoxy resin blends are liquid at 22° C. and the solidifying reaction takes place at the same temperature.

If further heating is required to obtain a stable pourable powder at 22° C. or thereabouts it rarely needs to be above 50° C.–60° C.

The simplicity and mildness of the approach to making these materials enables the incorporation of a wider variety of heat sensitive additives including hardeners and accelerators than is possible with the Hot Melt method and yields products with outstandingly long shop floor temperature storage times.

The use of temperatures above 60° C. to obtain suitable solids is only necessary to increase speed or throughput in production.

What is claimed is:

1. A method for the manufacture of a one-component, heat curable, thermosettable, epoxy resin system and its placement in a container, which method comprises mixing at 15–30° C.

(A) an epoxy resin or compound containing more than one expoxy group;

(B) an amine solidifying system present in insufficient quantities to cause gelation after all the amino hydrogen atoms are consumed by epoxy groups, under the reaction conditions chosen for (A) and (B), and which yields a product with a Kofler Heat Bank melting point of less than 55° C. and melting point stability of at least six months at normal workshop temperatures; in the presence of (C) a hardener system for (A) and the reaction product of (A) and (B) which is different from (B) and remains unreacted with (A) and (B) under the conditions of reaction chosen for (A) and (B);

(E) an expanding agent; and optionally (D) additives other than expanding agent (E) which modify the physical properties of the cured or uncured composition, with the proviso that no tertiary amines are present in the initial mixture or generated during the reaction which react under the conditions chosen for (A) and (B), in such a way that (A) and (B) react to completion at room temperature over a period of between 2–14 days, provided that the reaction between (A) and (B) does not generate enough heat in the container to activate reaction between the remaining epoxy groups and hardener (C), or expanding agent (E).

2. A method according to claim 1 in which the mixing of the composition is carried out batchwise or continuously.

3. A method according to claim 1 where the mixed composition and the shape and size of container ensure that the excess heat generated does not increase the temperature of the composition to a point to activate hardener (C) or expanding agent (E).

4. A method according to claim 1 where the composition is mixed in its final container.

5. A method according to claim 1 where the partially solidified composition is heated to speed completion provided the temperature chosen or the temperature reached due to the completion of the solidification reaction does not activate hardener (C) or expanding agent (E).

6. A method according to claim 1 where the majority of the epoxy groups are present as glycidyl ether, glycidyl amine, glycidyl ester and/or, cycloaliphatic glycidyl.

7. A method according to claim 1 where the compound or compounds containing more than one epoxy group individually or as mixtures are free flowing liquids at 80° C. or below.

8. A method according to claim 1 where the solidifying agents are mainly aromatic, cycloaliphatic or dicyclic primary amines, secondary amines or mixtures thereof and, optionally, acid accelerators.

9. A method according to claim 1 where the majority of the solidifying amine groups originates from at least difunctional amines.

10. A method according to claim 1 where hardener system (C) is selected from the group consisting of aromatic amines such as, 4,4'-diaminodiphenyl sulphone, boron trifluoride amine complexes, latent imidazoles, polycarboxylic acids, polyhydrazides, dicyandiamide, latent epoxy amine adducts and substituted ureas.

11. A method according to claim 9 wherein additives (D) are present.

12. A method according to claim 1 in which expanding agent (E) is an agent generating gases by chemical decomposition or by boiling of liquids or expansion of gases contained within expandable shells.

13. A one-component, heat-curable, thermosettable epoxy resin system obtained by reacting by mixing at 15–30° C.

(A) an epoxy resin or compound containing more than one epoxy group;

(B) an amine solidifying system present in insufficient quantities to cause gelation after all the amino hydrogen atoms are consumed by epoxy groups, under the reaction conditions chosen for (A) and (B), and which yields a product with a Kofler Heat Bank melting point of less than 55° C. and melting point stability of at least six months at normal workshop temperatures; in the presence of (C) a hardener system for (A) and the reaction product of (A) and (B) which is different from (B) and remains unreacted with (A) and (B) under the conditions of reaction chosen for (A) and (B);

(E) an expanding agent; and optionally (D) additives other than expanding agent (E) which modify the physical properties of the cured or uncured composition, with the proviso that no tertiary amines are present in the initial mixture or generated during the reaction which react under the conditions chosen for (A) and (B), in such a way that (A) and (B) react to completion at room temperature over a period of between 2–14 days, provided that the reaction between (A) and (B) does not generate enough heat to activate reaction between the remaining epoxy groups and hardener (C), or expanding agent (E).

14. A cured product obtained by heating a system according to claim 13.

* * * * *

UNITED STATES PATENT AND TRADEMARK OFFICE
CERTIFICATE OF CORRECTION

PATENT NO. : 6,346,573 B1
DATED : February 12, 2002
INVENTOR(S) : Peter Drummond Boys White It is certified that error appears in the above-identified patent and that said Letters Patent is hereby corrected as shown below:

Column 1,
Line 1, the word "-thermosettable-" should read -- -thermosettable- --;
Line 34, delete "is";
Line 54, the word "-harzards-" should read -- -hazards- --.

Column 2,
Line 14, "-80ºC.-" should read -- -80ºC- --;
Line 16, "-C.-30º C.-" should read -- -C -30ºC- --;
Line 32, the word "-compromise,-" should read -- -comprpomise- --;
Line 49, the word "-useability-" should read -- -usability- --.

Column 3,
Line 10, after "-(B)-" please add -- with (A) and (B) --.

Column 4,
Line 10, "-1 20º C-" should read -- -120º C- --;
Line 23, the world "-exandable-" should read -- -expandable- --.

Column 5,
Line 6, the word "-strength-" should read -- -strength- --;
Line 12, the word "-shows-" should read -- -show- --;
Line 13, the word "-use-" should read -- -used- --;
Line 14, the word "-do-" should read -- -does- --;
Line 32 and 36, "-220º C-" should read -- -22º C- --;
Line 57, "-260º C.-" should read -- -26º C- --.

Column 6,
Line 52, the word "-lack" should be -- -tack- --.

Column 7,
Line 3, "-260º C-" should read -- -26º C- --;
Line 16 and 38, "-3,3' dimethyl 4,4' diamino-" should read -- -33' dimethyl 44' diamino- --;
Line 44, please add after "-during-" should read -- which --;
Line 47, the word "-separat-" should read -- -separate- --;
Line 53, "-1 80º C-" should read -- -180º C- --.

UNITED STATES PATENT AND TRADEMARK OFFICE
CERTIFICATE OF CORRECTION

PATENT NO.    : 6,346,573 B1
DATED         : February 12, 2002
INVENTOR(S)   : Peter Drummond Boys White It is certified that error appears in the above-identified patent and that said Letters Patent is hereby corrected as shown below:

<u>Column 8,</u>
Line 10, "-4,4' diamino-" should read -- -44' diamino- -- ;
Line 16, the word "-or-" should read -- -of- -- ;
Line 33, "-3,3' dimethyl 4,4' diamino-" should read -- -33' dimethyl 44' diamino- -- .

<u>Column 9,</u>
Lines 1 and 38, the word "-EXAMPLE-" should read -- -EXAMPLES- -- .

<u>Column 11,</u>
Line 8, "-3,3' dimethyl 4,4' diamino-" should read -- -33' dimethyl 44' diamino- -- ;
Line 36, the word "-adherring-" should read -- -adhering- -- ;
Line 52, "-4,4' diamino 3,3' dimethyl-" should read -- -44' diamino 33' dimethyl- -- ;
Line 66, the word "-metalic-" should read -- -metallic- -- .

<u>Column 12,</u>
Line 6, the word "-framed-" should read -- -foamed- -- ;
Line 42, the word "-expoxy-" should read -- -epoxy- -- .

<u>Column 13,</u>
Line 17, "-and/or, cycloaliphatic glycidyl-" should read -- -and/or cycloaliphatic- -- ;
Line 31, delete the words "-such as-" and "-4,4'-diaminodiphenyl-" should read -- -44'-diaminodiphenyl- -- .

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,346,573 B1
DATED          : February 12, 2002
INVENTOR(S)    : Peter Drummond Boys White It is certified that error appears in the above-identified patent and that said Letters Patent is hereby corrected as shown below:

Column 1,
Line 1, the word "-thremosettable-" should read -- -thermosettable- --;
Line 34, delete "is";
Line 54, the word "-harzards-" should read -- -hazards- --.

Column 2,
Line 14, "-80ºC.-" should read -- -80ºC- --;
Line 16, "-C.-30º C.-" should read -- -C -30ºC- --;
Line 32, the word "-compromise,-" should read -- -compromise- --;
Line 49, the word "-useability-" should read -- -usability- --.

Column 3,
Line 10, after "-(B)-" please add -- with (A) and (B) --.

Column 4,
Line 10, "-1 20º C-" should read -- -120º C- --;
Line 23, the world "-exandable-" should read -- -expandable- --.

Column 5,
Line 6, the word "-strength-" should read -- -strength- --;
Line 12, the word "-shows-" should read -- -show- --;
Line 13, the word "-use-" should read -- -used- --;
Line 14, the word "-do-" should read -- -does- --;
Lines 32 and 36, "-220º C-" should read -- -22º C- --;
Line 57, "-260º C.-" should read -- -26º C- --.

Column 6,
Line 52, the word "-lack" should be -- -tack- --.

Column 7,
Line 3, "-260º C-" should read -- -26º C- --;
Lines 16 and 38, "-3,3' dimethyl 4,4' diamino-" should read -- -33' dimethyl 44' diamino- --;
Line 44, please add after "-during-" should read -- which --;
Line 47, the word "-separat-" should read -- -separate- --;
Line 53, "-1 80º C-" should read -- -180º C- --.

UNITED STATES PATENT AND TRADEMARK OFFICE
CERTIFICATE OF CORRECTION

PATENT NO. : 6,346,573 B1
DATED : February 12, 2002
INVENTOR(S) : Peter Drummond Boys White It is certified that error appears in the above-identified patent and that said Letters Patent is hereby corrected as shown below:

Column 8,
Line 10, "-4,4' diamino-" should read -- -44' diamino- -- ;
Line 16, the word "-or-" should read -- -of- -- ;
Line 33, "-3,3' dimethyl 4,4' diamino-" should read -- -33' dimethyl 44' diamino- -- .

Column 9,
Lines 1 and 38, the word "-EXAMPLE-" should read -- -EXAMPLES- -- .

Column 11,
Line 8, "-3,3' dimethyl 4,4' diamino-" should read -- -33' dimethyl 44' diamino- -- ;
Line 36, the word "-adherring-" should read -- -adhering- -- ;
Line 52, "-4,4' diamino 3,3' dimethyl-" should read -- -44' diamino 33' dimethyl- -- ;
Line 66, the word "-metalic-" should read -- -metallic- -- .

Column 12,
Line 6, the word "-framed-" should read -- -foamed- -- ;
Line 42, the word "-expoxy-" should read -- -epoxy- -- .

Column 13,
Line 17, "-and/or, cycloaliphatic glycidyl-" should read -- -and/or cycloaliphatic- -- ;
Line 31, delete the words "-such as-" and "-4,4'-diaminodiphenyl-" should read -- -44'-diaminodiphenyl- -- .

This certificate supersedes Certificate of Correction issued June 22, 2004.

Signed and Sealed this

Fourteenth Day of September, 2004

JON W. DUDAS
*Director of the United States Patent and Trademark Office*